US009154562B2

(12) United States Patent
Schulzrinne et al.

(10) Patent No.: US 9,154,562 B2
(45) Date of Patent: *Oct. 6, 2015

(54) SYSTEMS, METHODS, AND MEDIA FOR CONNECTING EMERGENCY COMMUNICATIONS

(71) Applicant: The Trustees of Columbia University in the City of New York, New York, NY (US)

(72) Inventors: Henning G. Schulzrinne, Leonia, NJ (US); Wonsang Song, New York, NY (US); Jong Yul Kim, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/031,582

(22) Filed: Sep. 19, 2013

(65) Prior Publication Data

US 2014/0023064 A1    Jan. 23, 2014

Related U.S. Application Data

(63) Continuation of application No. 12/524,034, filed as application No. PCT/US2008/052191 on Jan. 28, 2008, now Pat. No. 8,565,384.

(60) Provisional application No. 60/897,735, filed on Jan. 26, 2007.

(51) Int. Cl.
*H04M 11/04*  (2006.01)
*H04L 29/08*  (2006.01)
(Continued)

(52) U.S. Cl.
CPC ............. *H04L 67/18* (2013.01); *H04M 3/5116* (2013.01); *H04M 3/56* (2013.01); *H04M 2203/5009* (2013.01); *H04M 2242/14* (2013.01)

(58) Field of Classification Search
None
See application file for complete search history.

(56) References Cited

U.S. PATENT DOCUMENTS 5,799,061 A * 8/1998 Melcher et al. ................. 379/45
2001/0028711 A1 * 10/2001 Antonucci et al. ............ 379/245
(Continued)

OTHER PUBLICATIONS

"FAQ-What's Plazes", Plazes.com, Sep. 2006, pp. 1-6, available at: http://www.plazes.com/info/whatis/.
(Continued)

*Primary Examiner* — Maria El-Zoobi
(74) *Attorney, Agent, or Firm* — Byrne Poh LLP (57) ABSTRACT

Systems, methods, and media for connecting emergency communications are provided. For example, the methods can include: receiving an emergency communication at a particular public safety answering point from a caller directed to the particular public safety answering point by a location-to-service system; creating a conference on a conference system in response to the particular public safety answering point accepting the emergency communication; selecting a particular call-taker of a plurality of call-takers; sending the particular call-taker an invitation to accept the emergency communication; in response to receiving an indication that the particular call-taker has accepted the emergency communication, connecting the selected call-taker to the conference; connecting the caller to the conference; determining the location of the caller; querying the location-to-service system to identify at least one particular emergency responder of a plurality of emergency responders; and connecting at least one of the at least one particular emergency responder to the conference.

24 Claims, 7 Drawing Sheets

(51) Int. Cl.
 *H04M 3/51* (2006.01)
 *H04M 3/56* (2006.01)

(56) References Cited

U.S. PATENT DOCUMENTS

2005/0243982 A1* 11/2005 Starbuck et al. ........... 379/88.23
2007/0105528 A1 5/2007 Haas et al.

OTHER PUBLICATIONS

Campbell, B., et al., "Session Initiation Protocol (SIP) Extension for Instant Messaging", Technical Report, RFC 3428, Dec. 2002, pp. 1-19.
Fielding, R., et al., "Hypertext Transfer Protocol—HTTP/1.1", Technical Report, RFC 2616, Jun. 1999, pp. 1-114.
International Preliminary Report on Patentability dated Aug. 6, 2009 in International Patent Application No. PCT/US2008/052191.
International Search Report dated May 23, 2008 in International Patent Application No. PCT/US2008/052191.
Kim, J.Y., et al., "An Enhanced VoIP Emergency Services Prototype", in Proceedings of the 3rd International ISCRAM Conference, Newark, NJ, USA, May 2006, pp. 1-8.
Mintz-Habib, M., et al., "A VoIP Emergency Services Architecture and Prototype", in Proceedings of the 14th International Conference on Computer Communications and Networks (ICCCN '05), San Diego, CA, USA, Oct. 17-19, 2005, pp. 523-528.
National Emergency Number Association, "VoIP/IP", NENA.org, Dec. 27, 2007, pp. 1-8, available at: http://www.nena.org/VoIP_IP/.
Notice of Allowance dated Feb. 6, 2013 in U.S. Appl. No. 12/524,034.
Notice of Allowance dated Jun. 20, 2013 in U.S. Appl. No. 12/524,034.
Office Action dated Jul. 24, 2012 in U.S. Appl. No. 12/524,034.
Rosen, B., "Emergency Call Information in the Domain Name System", Technical Report, Internet Draft, Oct. 23, 2005, pp. 1-22, available at: draft-rosen-dns-sos-03.txt.
Rosenberg, J., et al., "SIP: Session Initiation Protocol", Technical Report, Internet Engineering Task Force, RFC 3261, Jun. 2002, pp. 1-202, available at: http://www.ietf.org/rfc/rfc3261.txt.
Schulzrinne, H., "A Uniform Resource Name (URN) for Services", Technical Report, Internet Draft, Oct. 23, 2005, pp. 1-8.
Schulzrinne, H., "Location-to-URL Mapping Protocol (LUMP)", Technical Report, Internet Draft, Oct. 23, 2005, pp. 1-15.
Telecommunications Industry Association (TIA), "LLDP Media Endpoint Discovery Project", Technical Report PN-3-0185, Draft 08, Apr. 26, 2005, pp. 1-119.
Written Opinion dated May 23, 2008 in International Patent Application No. PCT/US2008/052191.
Wu, X. and Schulzrinne, H., "SIPC, a Multi-Function SIP User Agent", in Proceedings of the 7th IFIP/IEEE International Conference, Management of Multimedia Networks and Services (MMNS '04), San Diego, CA, US, Oct. 3-6, 2004, pp. 269-281.
"Cinema—Columbia InterNet Extensible Multimedia Architecture", Columbia.edu, Dec. 2005, pp. 1-2, available at: http://www.cs.columbia.edu/IRT/cinema.
Cisco, "Configuring Cisco Discovery Protocol", Cisco.com, Feb. 2004, pp. 1-6, available at: http://www.cisco.com/univercd/cc/td/doc/product/software/ios122/122cgcr/ffun_c/fcfprt3/fef015.htm.
GeoComm Corporation, "GeoLynx Dispatch Mapping System", Geocomm.com, Aug. 17, 2005, pp. 1-3, available at: https://web.archive.org/web/20050817053806/http://www.geocomm.com/.
Refractions Research, "What is PostGIS", Postgis.refractions.net, Sep. 27, 2006, pp. 1-2, available at: https://web.archive.org/web/20060927230520/http://postgis.refractions.net/.

* cited by examiner

SYSTEMS, METHODS, AND MEDIA FOR CONNECTING EMERGENCY COMMUNICATIONS

CROSS-REFERENCE TO RELATED APPLICATION

This application is a continuation of U.S. patent application Ser. No. 12/524,034, filed Aug. 11, 2010, which is the U.S. National Phase Application under 35 U.S.C. §371 of International Application No. PCT/US2008/052191, filed Jan. 28, 2008, which claims the benefit of U.S. Provisional Patent Application No. 60/897,735, filed Jan. 26, 2007. Each of the above-referenced patent applications is hereby incorporated by reference herein in its entirety.

STATEMENT REGARDING FEDERALLY SPONSORED RESEARCH OR DEVELOPMENT

The government may have certain rights in the present invention pursuant to a grant by the Technology Opportunities Program (TOP) of the National Telecommunications and Information Administration (NTIA), grant number 48-60-04012.

TECHNICAL FIELD

The disclosed subject matter relates to systems, methods, and media for connecting emergency communications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

People around the world now use Voice-Over-Internet-Packet (VoIP) services and other IP services, such as text messaging and video conferencing, as means of communication. In some cases, this is their primary or only means of communication from some locations. People are also accustomed to being able to contact local emergency services by, for example, dialing 911. Issues presented by the combination of IP services and emergency services include, for example, determining the location of callers and routing emergency phone calls to appropriate emergency call-takers.

Systems and standards are being developed for the combination of emergency services and VoIP networks. In the United States, for example, the National Emergency Number Association (NENA) has taken initiative to lay out the future steps for the evolution of Enhanced 9-1-1 (E9-1-1). Another example, Next Generation E9-1-1 (NG E9-1-1), the name for the long term solution that is completely IP based, supports requirements of traditional systems as well as new features made feasible by transitioning to IP.

One protocol used, for example, to set up and tear-down network communications is Session Initiation Protocol (SIP). SIP can be used for creating, modifying, and terminating sessions with one or more participants and for creating two-party, multiparty, or multicast sessions that include Internet telephone calls, multimedia distribution, and multimedia conferences. SIP is independent of the underlying transport layer and it can run on, for example, Transmission Control Protocol (TCP), User Datagram Protocol (UDP), or Stream Control Transmission Protocol (SCTP). One element of a SIP system is a SIP proxy server that can be used to, for example, route requests to a user's current location, authenticate and authorize users for services, implement provider call-routing policies, and provide various features to users. SIP also defines various messages types that can currently be found in RFC 3261, available from the Internet Engineering Task Force (IETF).

SUMMARY

Systems, methods, and media for connecting emergency communications are provided. In some embodiments, methods for handling emergency communications are provided, the methods including: receiving an emergency communication at a particular public safety answering point from a caller directed to the particular public safety answering point by a location-to-service system; creating a conference on a conference system in response to the particular public safety answering point accepting the emergency communication; selecting a particular call-taker of a plurality of call-takers; sending the particular call-taker an invitation to accept the emergency communication; receiving an indication that the particular call-taker has accepted the emergency communication; in response to receiving the indication that the particular call-taker has accepted the emergency communication, connecting the selected call-taker to the conference; connecting the caller to the conference; determining the location of the caller; querying the location-to-service system to identify at least one particular emergency responder of a plurality of emergency responders; and connecting at least one of the at least one particular emergency responder to the conference.

In some embodiments, computer-readable media storing instructions that, when executed by a processor, cause the processor to perform methods for handling emergency communications are provided, the methods including: receiving an emergency communication at a particular public safety answering point from a caller directed to the particular public safety answering point by a location-to-service system; creating a conference on a conference system in response to the particular public safety answering point accepting the emergency communication; selecting a particular call-taker of a plurality of call-takers; sending the particular call-taker an invitation to accept the emergency communication; receiving an indication that the particular call-taker has accepted the emergency communication; in response to receiving the indication that the particular call-taker has accepted the emergency communication, connecting the selected call-taker to the conference; connecting the caller to the conference; determining the location of the caller; querying the location-to-service system to identify at least one particular emergency responder of a plurality of emergency responders; and connecting at least one of the at least one particular emergency responder to the conference.

In some embodiments, public safety answering points including a plurality of call-takers; a policy server storing information indicating the availability of the plurality of call-takers; a controller in communication with the policy server for selecting a particular call-taker of the plurality of call-takers based at least in part on the information indicating availability of the plurality of call-takers stored in the policy server; and a conference system in communication with the plurality of call-takers, the controller, and a plurality of emergency responders are provided, wherein the controller: receives an emergency communication from a caller directed to the public safety answering point by a location-to-service system; creates a conference on the conference system in response to accepting the emergency communication at the public safety answering point; selects a particular call-taker of a plurality of call-takers; sends the particular call-taker an invitation to accept the emergency communication; receives indication that the particular call-taker has accepted the emergency contact; in response to receiving the indication that the particular call-taker has accepted the emergency communication, connects the selected call-taker to the conference; connects the caller to the conference; determines the location of the caller; queries the location-to-service system to identify at least one particular emergency responder of a plurality of emergency responders; connects at least one of the at least one particular emergency responder to the conference.

DETAILED DESCRIPTION

Figure 1:
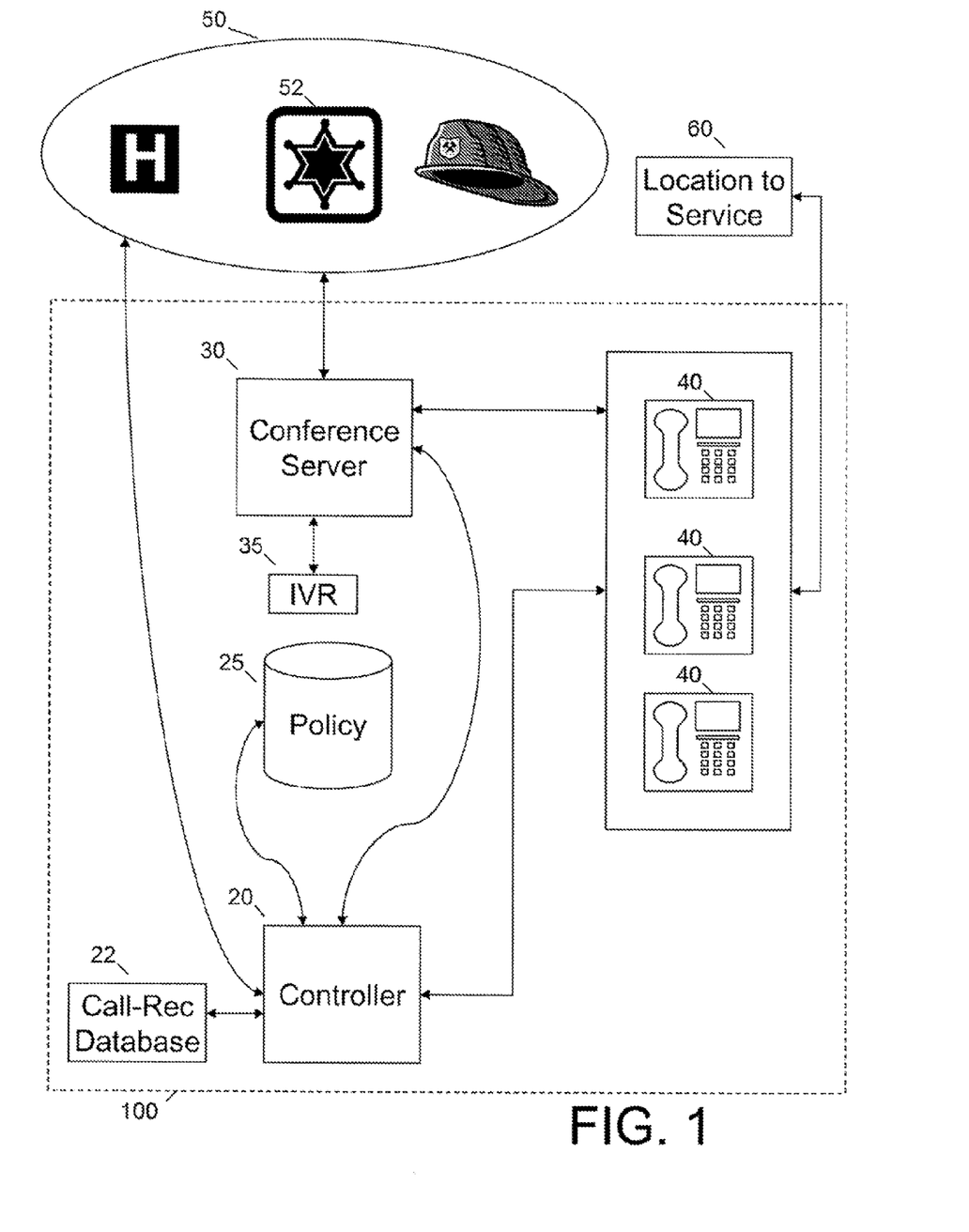
FIG. 1 is an illustration of a system for connecting emergency calls in accordance with some embodiments of the disclosed subject matter.

Systems, methods, and media for connecting emergency communications are provided. FIG. 1 illustrates a controller 20 in an IP public safety answering point (IP PSAP) architecture. When a call is made by an emergency caller, it can be directed to a system 100 by a SIP proxy server. In system 100, the call can be received by controller 20 and media streams can be directed to conference server 30. The term "call" is used merely as an example, the same and/or similar systems and methods can used to handle communications over various media types, such as, voice communications, text communications, video communications, still images, etc. and/or various combinations of the same. Controller 20 can be, for example, a back-to-back SIP user agent that can handle calls routed into system 100 and can support various functions not possible in a one-to-one communication. Call-takers 40 can accept emergency calls, for example, after being selected to do so by controller 20. Policy database 25 can store various policy settings which controller 20 can use in determining, for example, which call-taker 40 to select. Conference server 30 can set up conferences to be used for communications between various participants, for example, a call-taker 40, an emergency caller (not pictured in FIG. 1), and/or an emergency responder 50, such as the police 52. Conferences on conference server 30 can be used by participants for exchanging various media types (e.g., voice, text, and/or video) with each other. Conference server 30 can also include or be in communication with, for example, interactive voice response system (IVR) 35 that can be used, for example, for text-to-speech and speech-to-text services. In selecting among various possible emergency responders 50 to contact, a call-taker 40 can consider an emergency caller's location by using, for example, a location-to-service service 60, such as Location to Service Translation (LoST) from the Internet Engineering Task Force (IETF). In some embodiments, location-to-service service 60 can also be used, for example, by a SIP proxy to select a system 100 among various systems 100 when a communication is initiated by a caller.

Figure 2:
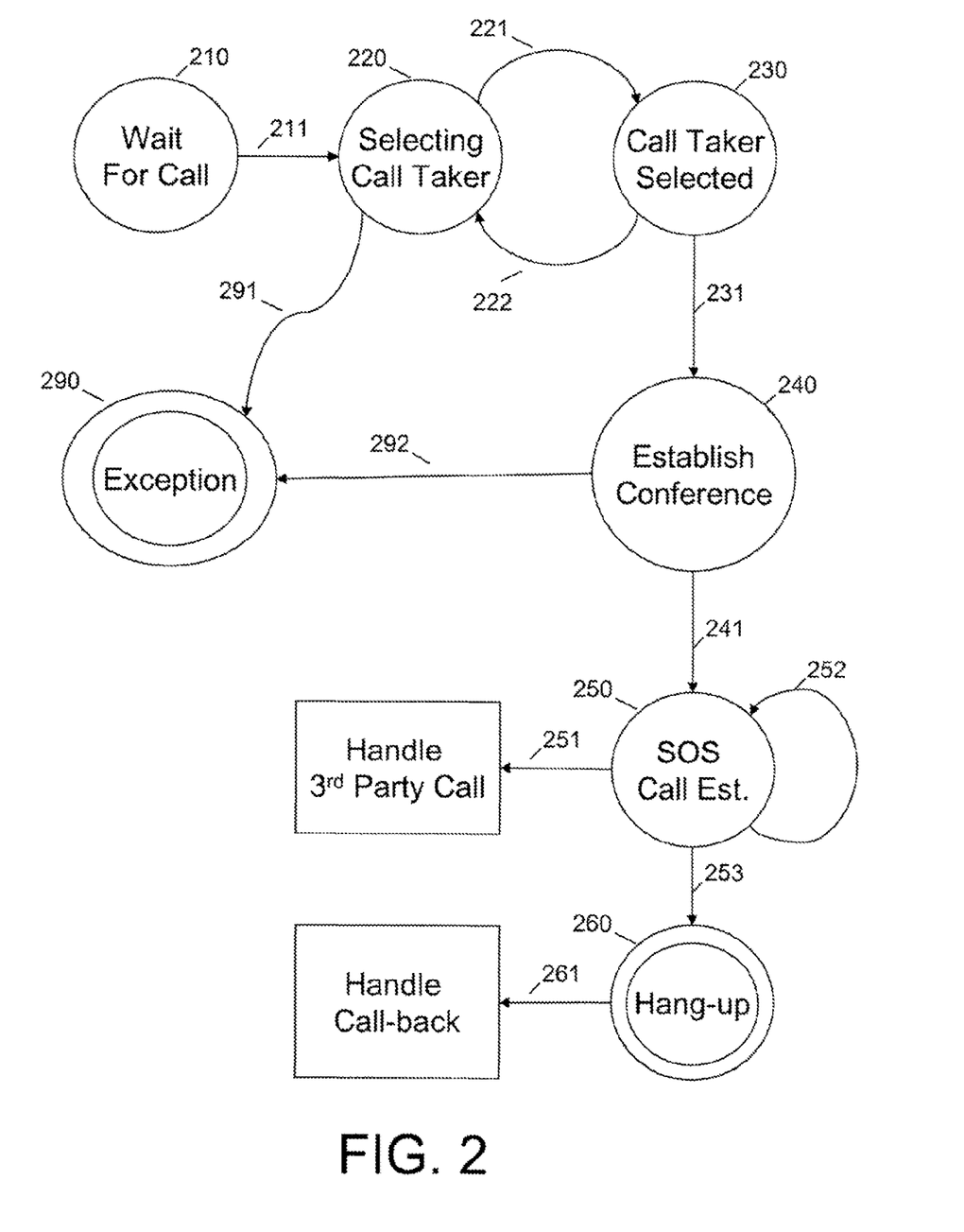
FIG. 2 is an illustration of a state diagram of a controller of FIG. 1 connecting emergency calls in accordance with some embodiments of the disclosed subject matter.

Controller 20 can be implemented in various ways, for example, as a digital processing device with logic written in C++ using the Columbia InterNetExtensible Multimedia Architecture (CINEMA) library. CINEMA can provide SIP functions and state machines that comply with, for example, RFC 3261. FIG. 2 illustrates a state diagram where controller 20 is waiting, at 210, for a call from a caller. When a call is received, a conference can be created, at 211, at conference server 30, a call-taker 40 can be selected, at 220, and an invite request, such as a SIP INVITE, can be sent, at 221, to the selected call-taker, possibly along with information, such as the conference server IP and port for media negotiations. At state 230, if the selected call-taker is, for example, busy or there is a timeout before a response to the invite is sent, the state can return, at 222, to state 220 so that a new call-taker can be selected. The logic that performs call-taker selection can take various forms, such as, for example, a script, and can be customized to accommodate various polices which can be stored on policy server 25. At 231, the call-taker connects to the line (e.g., picks up his phone), and, at 240, the call-taker can be invited to and can join the conference. Also at 240, the caller can be invited and connected to the conference. The emergency communications between the caller and call-taker can occur at state 250. During an emergency conference, a call-taker can invite, at 251 other parties, such as emergency responders 50 to the conference. The conference can be terminated, at 260, when, for example, the call-taker hangs up, at 253.

In some embodiments, a caller can be bridged into a conference before the call-taker is notified. In other embodiments, the call-taker is notified first, bridged into the conference upon accepting the call, and then the caller is bridged into the conference. This can result in the call-taker being more quickly alerted and reduces the chance of a caller being confused by entering a conference where he is the only participant. The order in which participants are alerted of and enter the conference can be controlled by policy settings, stored, for example, on policy server 25.

In various embodiments, various exceptions can occur. For example, returning to state 220, all call-takers may be busy answering other calls. If so, a message, such as a "486 Busy Here" response can be sent, at 291 to, for example, a SIP proxy server. The SIP proxy server can, for example, route the call to another system 100, or the call can be queued in controller 20. If the call is queued, calls can be taken out of the queue in the order in which they were received, or upon other criteria stored, for example, in policy server 25, as call-takers become available.

When a caller is waiting in a queue, he can receive announcements, which can be created or selected dynamically. For example, if many calls are received within a certain timeframe and are received from locations near one another, a message can be generated and sent to a waiting caller. A caller receiving this message can have the option, for example, of hanging up or continuing the call by responding with a yes or no. For example, if many calls are received at about the same time from near the same address as a result of a fire, the message can state "Are you calling about the fire on Broadway?" If the caller responds "Yes," they can receive another message stating "We're taking care of the situation. Would you like to continue this call?" The nearness of emergencies and/or callers can be calculated using geographic coordinates of the caller's location and/or the emergency location. For example, queued callers within X miles of an emergency location who call within T seconds of the first reported incident can be provided with a message. X and T can be configured and can be stored, for example, in policy server 25. In some embodiments, controller 20 can manage the queue and can decide whether to start an automated session, but the actual delivery of, for example, an automated voice message can be done with other equipment, such as interactive voice response system (IVR) 35 and/or a SIP proxy server. In some embodiments, a SnowShore IP Media Server can be used as an IVR gateway and an IBM Webpshere Voice Server can be used for Text-to-Speech and voice recognition.

Real-time text (e.g., Text Over IP) can be provided by some embodiments of the disclosed subject matter and can be made available in a conference at the same time as, for example, voice, video, and/or other text based media. Using real-time text, each single character of text can be sent and received as it typed by a user. In some embodiments, controller 20 can act as a relay between a caller 10 and a call-taker 40 and can receive session description protocol (SDP) negotiations in real-time. To send real-time text, software can be installed on a client that, for example, sends each character as it typed on a keyboard. Some embodiments can use software that uses the standardization of Real-time-text described in ITU-T Recommendation T.140, available from the International Telecommunication Union (ITU). Real-time text connections can be established either directly between a call-taker and a caller or indirectly through a conference on conference server 30.

In some cases, a call can overflow from one call center to another. For example, if an entire system 100 is down (e.g., a major catastrophe in the area of the call center) and no reply message can be sent back in response to an invitation, a SIP proxy can route the call to another system 100. In other cases, for example, a first system 100 is operational, but all the call-takers 40 are busy and the queue is filled (or a decision has been made not to queue calls or certain calls). In this case the first system 100 can redirect the call to another system 100, which can be, for example, a pre-selected backup system 100. In some embodiments, utilization levels can be monitored by, for example, a controller 20 subscribing and receiving notify messages regarding the queue volume of other controllers 20. Based on utilization levels, for example, a controller 20 of a busy system 100 can overflow an incoming call to another, less busy, system 100. In deciding what system 100 to overflow to, a controller 20 can also consider location information from location-to-service service 60, by for example, requesting some number of systems 100 close to an emergency from location-to-service 60.

Another exception that can occur is a failed conference setup. This can occur, for example, if a conference server goes down. In such a case, a message, such as a "500 Server Internal Error" can be sent, at 292. In response, a SIP proxy server can, for example, route the call to another system 100.

In some embodiments, the systems and methods of the disclosed subject matter can inhibit a call from being terminated. For example, a "403 Forbidden" response can be sent, at 252, when a caller sends a SIP BYE. Some embodiments have modified a SIP user agent so that it does not hang up on a call for which a "403 Forbidden" response has been received.

Figure 3:
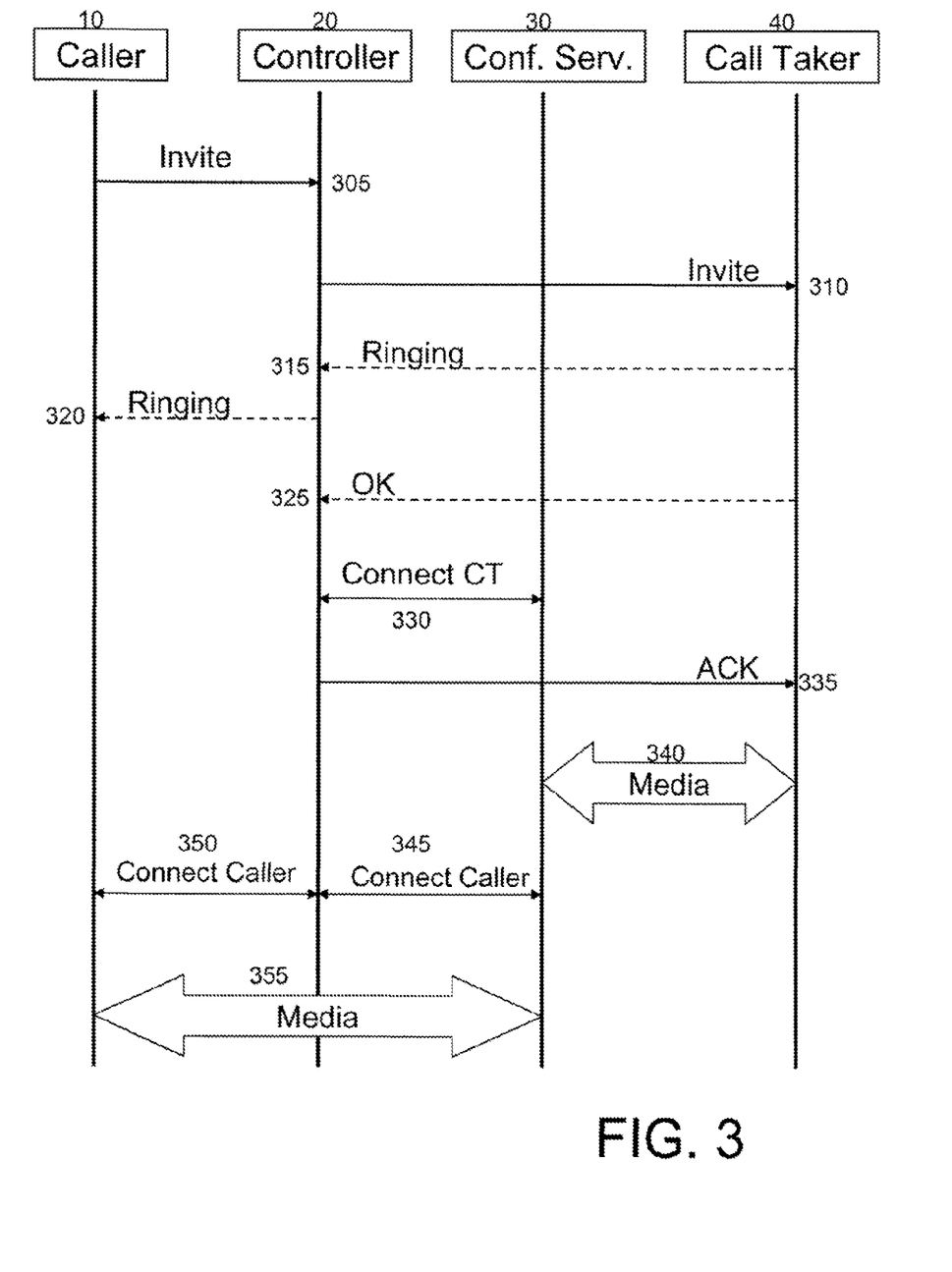
FIG. 3 is an illustration of a call-flow between a caller, a controller, a conference server, and a call-taker that can connect emergency communications in accordance with some embodiments of the disclosed subject matter.

FIG. 3 illustrates a call flow where caller 10 sends, at 305, an invite to controller 20 to initiate an emergency call. This invite can include, for example, location information of the caller as well as a preference for the type of media desired in a connection (e.g., voice, video, and/or text). A conference can be set up at conference server 30 at various times at the request of various components, for example, a conference can be set up as a result of an invite being sent from controller 20 to conference server 30. Controller 20 can send, at 310, an invite to call-taker 40, including, for example, the location information received in the invite at 305. The invite, sent at 310, can also include, for example, header information indicating that the call relates to a new incident and a conference Uniform Resource Identifier (URI) for the conference set up on conference server 30. At 315, call-taker 40 can send a ringing message (e.g., 180 Ringing) to controller 20 which can send, at 320, a ringing message to caller 10, this can cause, for example, a ringing sound to be played on an earpiece of caller 10. At 325, a message indicating that call-taker 40 has accepted the communication (e.g., connected to the line, picked up the phone, and/or accepted a video chat, etc.) can be sent to controller 20. This message can be, for example, a 200 OK message which can include the media preference of call-taker 40. Various messages can be sent, at 330, between controller 20 and conference server 30 to set up a media connection 340. For example, controller 20 can send an invite to conference server 30 that includes the media preference of call-taker 40. In response, conference server 30 can send a 200 OK to controller 20 and controller 20 can respond with an ACK. At 335, controller 20 can send an ACK to call-taker 40 including, for example, the media type of the conference, and connection information such as an IP address and/or port ID for sending and/or receiving information. At 345 and 350, a media connection 355 can be set up between caller 10 and conference server 30. This can include, for example, an invite message sent from controller 20 to conference server 30 that can include the media preference of caller 10, a 200 OK message sent from conference server 30 to controller 20 including the selected media type, a 200 OK message sent from controller 20 to caller 10 including the selected media type, an ACK from controller 20 to conference server 30, and an ACK from caller 10 to controller 20.

Various types of text messages such as, for example, text messaging and/or real-time instant message can be used to interact with emergency services in some embodiments. To support text messages, controller 20 can act, for example, like a multicast router. When one participant sends a text message it can be copied to all or some of the participants in the conference. When controller 20 receives a message request, it can distribute the message request to other participants. Participants with text messaging capability can return, for example, "200 OK." If delivery fails, then a response, such as a "4xx" or "5xx" response can be returned by the receiver, and controller 20 can notify the sender of the failure. In some embodiments, controller 20 does not send failure responses from participants other than, for example, the caller or primary call-taker; this can avoid, for example, text windows flooding with failure responses if multiple third party participants fail to get text messages.

In some embodiments, calls can be routed to a system 100 and/or to a particular call-taker based on an emergency callers language preference. For example, various call-takers' language capabilities and/or preferences can be stored in a database as quotients. A call-taker who, for example, is fluent in English and Spanish can designate both languages as a 1, a call-taker who is fluent in English and can take calls in Spanish, but is not quite fluent, can designate English as a 1 and Spanish as a 0.5, and a call-taker who speaks only English or is fluent in English and speaks only a little Spanish can designate English as a 1 and Spanish as a 0. For example, a SIP user agent can be provided with a language selection window in which a caller can choose languages in the order of their preferences. When a call is made by a caller, a SIP INVITE request with an Accept-Language header can be sent. The syntax and semantics for the language selection information can use, for example, the syntax and semantics of Hypertext Transfer Protocol (HTTP/1.1). Headers used to convey language preference can be ISO 639 2-letter language codes that correspond to the languages the caller selected and the q-values which indicate the order of the caller's language preference. For example, "Accept-Language: en, ko; q=0.8", which means English is the preferred language (quotient=1), with Korean being an alternate language with a quotient of 0.8.

Various situations can result in a call being disconnected. When a disconnection occurs, some embodiments can call back the caller. For example, a call-taker's SIP client can have a call-back button which, when clicked, initiates a call to controller 20 with a header named "In-Reply-To." The value of this header can be an instance number of the disconnected call. Using the instance number, a call log for the emergency caller's SIP URI can be queried and the call can be routed to the caller. In this way, the call can be established as a conference. Call back calls can be logged separately, but they can have a link that refers back to the disconnected call. In some embodiments, the same conference can be used and the caller can be contacted as if the caller was a third party, and in other embodiments a new conference can be created for the call-back. A call back can be initiated, for example, at 261.

In some embodiments, information can be recorded into a database 22, such as a call-record database, that can be located on or in communication with controller 20. The recorded data can include, for example, the caller SIP URI, the call-taker URI, the time the call was received, and the time the call was answered. Incoming calls can be logged regardless of whether they succeed or fail in getting through to a call-taker. A separate web interface of the call log can display this information and can allow call-takers to append incident codes and comments to the log. Call response time, calls per hour, week, or month, etc., and number call receives can be displayed on a per call-taker or per group of call-taker basis.

In some embodiments, various systems and methods for muting are provided. Fully mute, where a caller cannot be heard or hear other participants, as well as partial mute, where a caller can be heard, but not hear others are provided. Muting functionality can be provided using, in part, conferencing features of Snowshore IP Media. For fully mute, controller 20 can generate a SIP INFO message with a Media Server Control Markup Language (MSCML) request with the attribute of the caller's conference leg set as parked and send it to the conference server 30 causing server 30 not to send and receive any voice (or possibly other media types) to and from the caller. If partially mute is requested by a call-taker 40, controller 20 can request the conference server 30 to create a private group in the conference and to put all participants, except the caller, as members of the private group. Because the caller is not a member, he cannot receive the media from other participants, while other participants and send a receive media to/from each other and from the caller. During mute, other media types can also be inhibited. For example, text messages can intentional not be delivered and video input/output can be stopped and replaced, for example, with a message stating "Video Mute."

When a caller's location changes during an emergency call, the location can be updated. For example, the caller's SIP user agent can send updated location information to controller 20 using a SIP UPDATE message. The new location information can be stored in a call record database by controller 20 and passed to the call-taker to be, for example, displayed in mapping software.

A call-taker can dispatch responders based in part of the nature of the emergency. For example, if a fire is reported, a fire engine can be dispatched. Various responders can have various jurisdiction and, in dispatching responders, the location information of the emergency can be used to retrieve information about which responders cover the area of an emergency location. For example, when the location of an emergency is received, the call-taker's SIP client can send a location-to-service server a query by providing the caller's location and a service URN representing the service type of a responder. The responder's information, such as name and contact URL, can be returned from the location-to-service server and stored in a responder list. The query can be repeated for all service types (e.g., fire, ambulance, police, etc.). The call-taker and/or controller 20 can determine an emergency responder's location (e.g. the area that an emergency responders serves), for example, by querying a location-to-service service for this information.

Various systems and methods can be used in determining the location of a caller's device (e.g., the location of the device of a caller), such as, for example, Cisco Discover Protocol (CDP), Dynamic Host Configuration Protocol (DHCP), Global Positioning System (GPS), Link Layer Discovery Protocol-Media Endpoint Discover (LLPD-MED), lists of MAC addresses and locations, Bluetooth, asking the caller, and/or manual entry of location by administrators. In Cisco Discovery Protocol (CDP), a protocol used for discovering devices on a network, for example, switches send periodic messages to a well-known multicast address. CDP messages contain the name of the switch and the ID of the port that is sending the message. In some applications, the area covered by a switch/port is small enough to be useful for emergency calling purposes. Switches can cover a floor or half a floor, but each port leads to a jack in a specific room, so port information can yield room-level accuracy. To get location data from switch and port information, some embodiments use a database located in an administrative domain that contains the mapping between the two.

Figure 4:
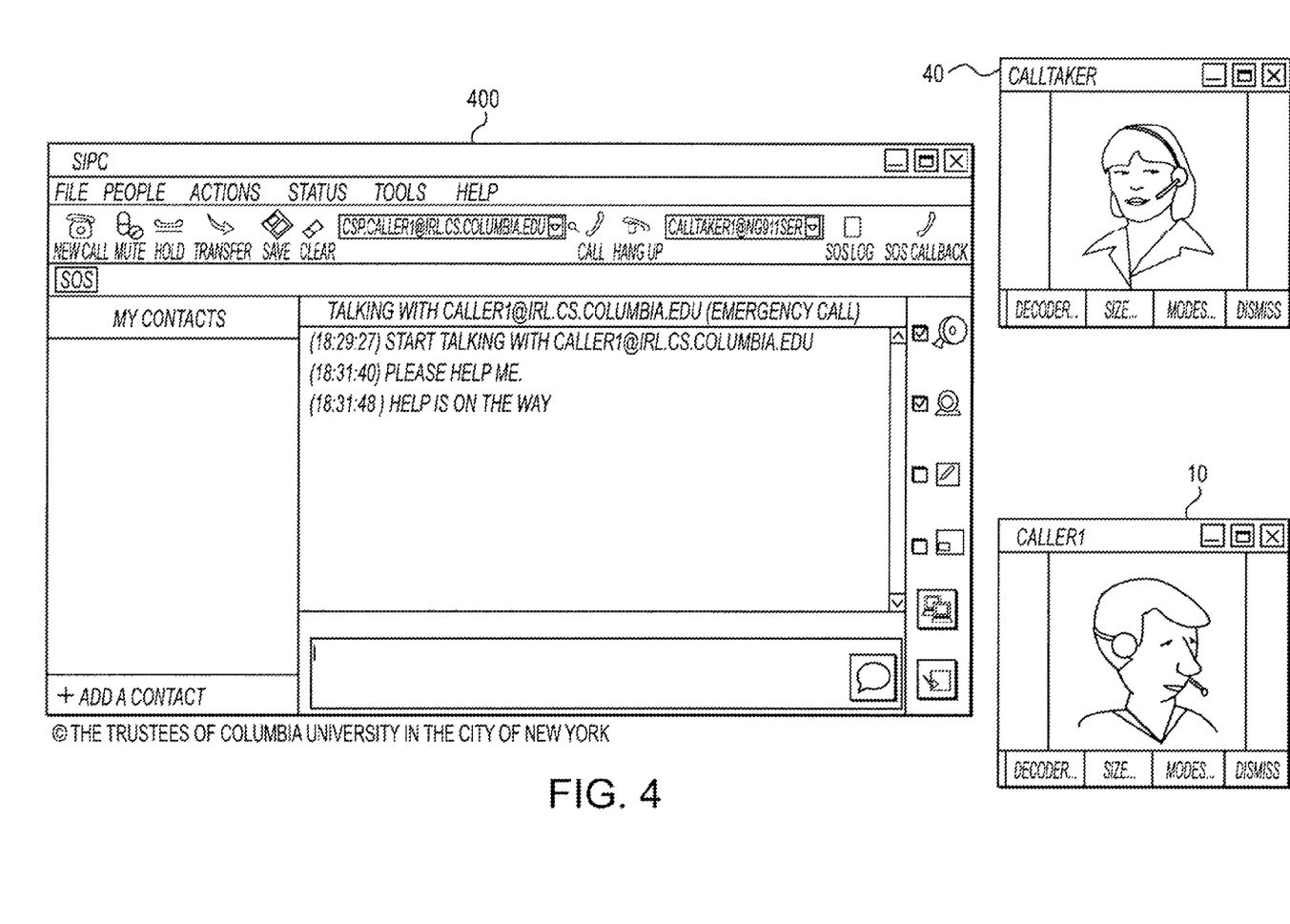
FIG. 4 is an illustration of video chat windows and a text chat window displayed on a screen of a call-taker in accordance with some embodiments of the disclosed subject matter.

FIG. 4 illustrates a call-taker 40 and a caller 10 communicating with voice, text, and video. In various embodiments, depending, for example, on the technology available to the caller 10 and/or call-taker 40, different or more limited media types may be available. Window 400, which can be displayed to call-taker 40, includes various options for the call-taker including, for example, mute, hold, save, clear, call, hang-up, log, and call-back.

Figure 5:
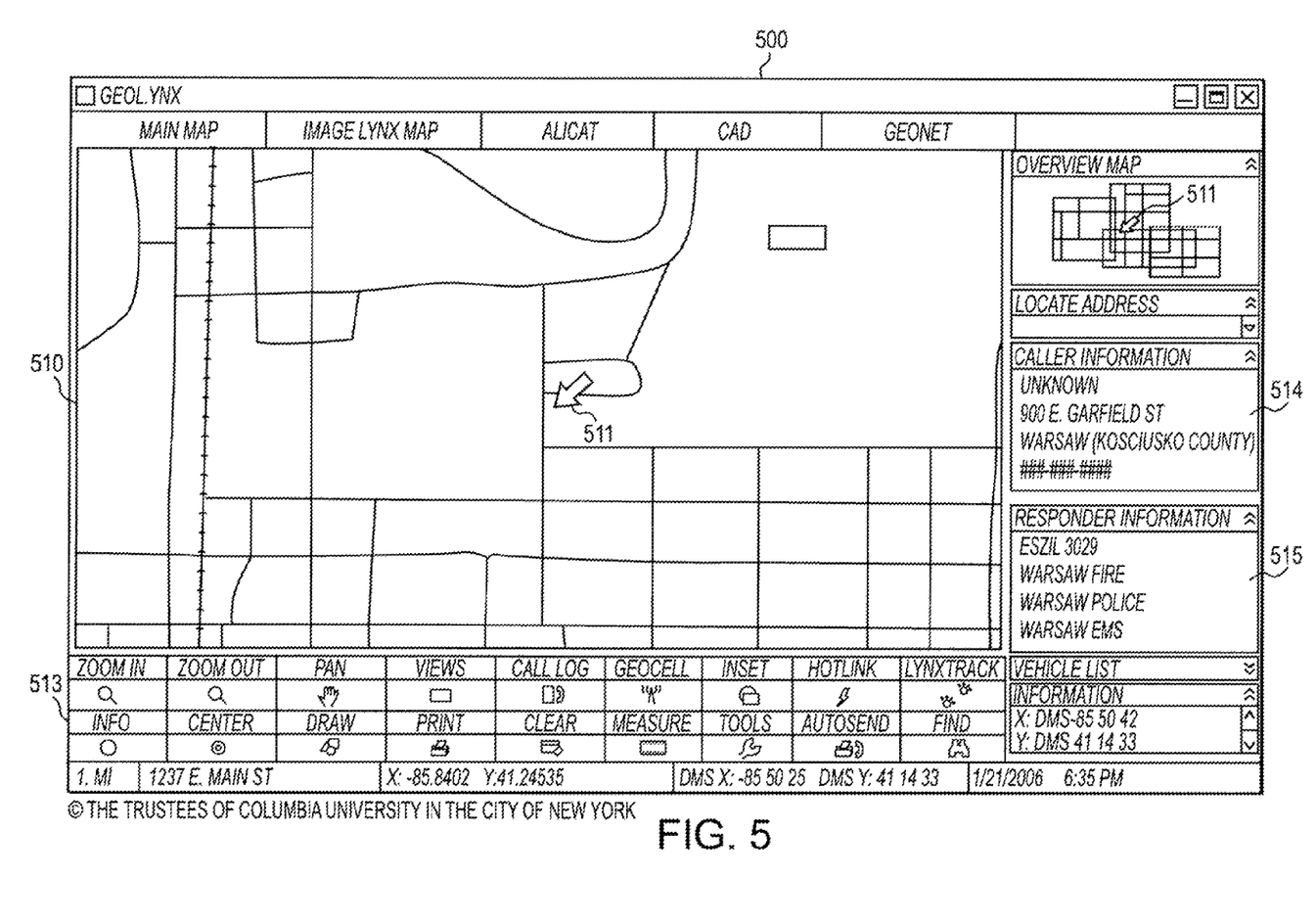
FIG. 5 is an illustration of a map identifying the location of an emergency caller displayed on the screen of a call-taker in accordance with some embodiments of the disclosed subject matter.

FIG. 5 illustrates window 500 that can be displayed to call-taker 40 to provide the call-taker with information about, for example, the location of the emergency and/or the caller. Window 500 can include a map 510, indicating the caller's location 511, various options 513, textual information about the caller 514, and information 515 about appropriate responders 50. Various mapping systems can be used, such as, for example, Geolynx, Google Maps, etc.

Figure 6:
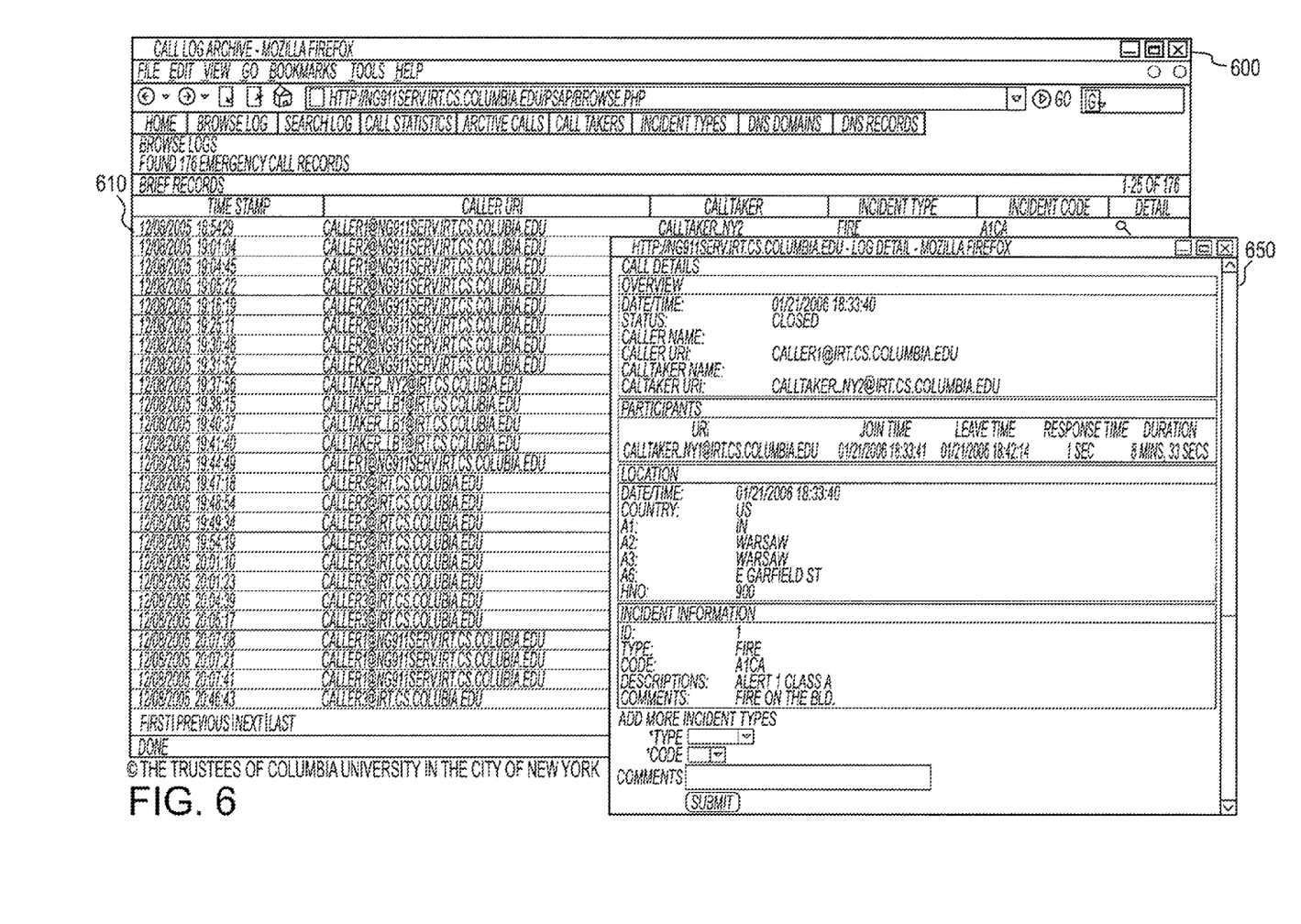
FIG. 6 is an illustration of call log information stored and displayed in accordance with some embodiments of the disclosed subject matter.

FIG. 6. illustrates call log windows of call information that can be stored, for example, in database 22. Window 600 can display a list of calls 610 along with the corresponding time stamps, caller URIs, call-takers, incident types, and incident codes. By selecting a specific call, more details of that call can be displayed in window 650.

Figure 7:
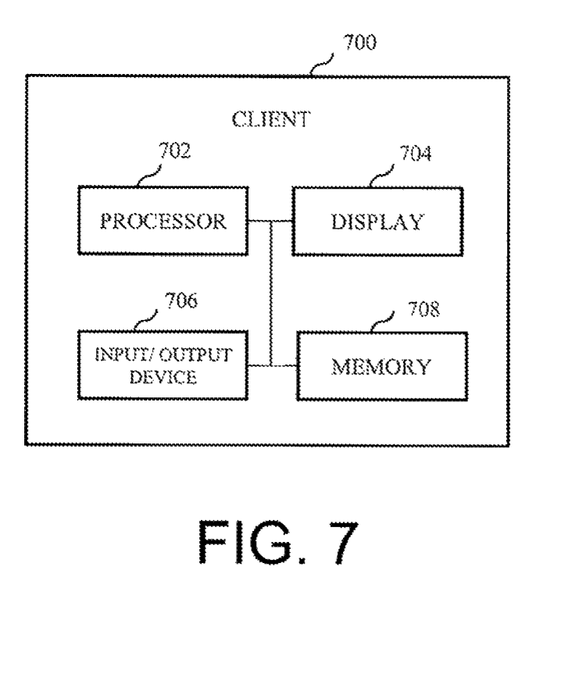
FIG. 7 is an illustration of a client suitable for implementation of various devices, systems, and methods in accordance with some embodiments of the disclosed subject matter.

In some embodiments, various components illustrated in the figures and described herein can be located on different physical machines, the same physical machine, or combinations thereof. For example, in some embodiments conference server 30, policy server 25, and controller 20 can be located on one machine, while in other embodiments, they can be located on different machines. Various components can be implement using various combinations of hardware and software. Referring to FIG. 7, a client 700 can include, among other things, processor 702, display 704, input/output device 706, and memory 708, which can be interconnected. The input/output device can receive input and send output such as, for example, text from keyboard, images from a camera, images from a scanner, audio input, voice-to-text translations, network traffic, and/or packets. In some embodiments, memory 708 can store programs for controlling processor 702 and/or performing methods such as those described herein, for example, the method illustrated in FIG. 3. Variations and combinations of client 700 might be suitable for different embodiments of the disclosed subject matter and various components of some embodiments of the disclosed subject matter can be implemented on any suitable platform. In addition, various clients 700 can be in communication with each other over various networks including the Internet, an intranet, a wide-area network (WAN), a local-area network (LAN), a wireless network, a frame relay network, an asynchronous transfer mode (ATM) network, a virtual private network (VPN), a mobile ad-hoc network (MANET), phone network, etc. or any combination of any of the same. The device used by caller 10 can be a client 700 and can implemented, for example, as a cell-phone, a SIP phone, a personal computer, a personal digital assistant, and/or a camera phone. In another example, client 700 can be used as a call-taker 40 and can include, for example, a SIP phone, a workstation, monitors, and/or speakers.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for connecting emergency communications, comprising:
receiving an emergency communication at a particular public safety answering point from a caller directed to the particular public safety answering point by a location-to-service system;
automatically creating a conference on a conference system in response to the particular public safety answering point accepting the emergency communication prior to communications between a particular call-taker and the caller;
connecting the particular call-taker to the conference;
connecting the caller to the conference;
determining the location of the caller;
querying the location-to-service system to identify at least one particular emergency responder of a plurality of emergency responders; and
connecting at least one of the at least one particular emergency responder to the conference.

2. The method of claim 1, further comprising inhibiting the caller from terminating the connection of the caller to the conference until the particular call-taker indicates the conference can terminate.

3. The method of claim 1, further comprising selecting the particular call-taker of a plurality of call-takers based on a language preference of the particular call-taker and a language preference of the caller.

4. The method of claim 1, further comprising calling back the caller if the connection of the caller to the conference is terminated.

5. The method of claim 1, wherein the conference is at least one of a voice conference, a text conference, and a video conference.

6. The method of claim 1, wherein the caller is connected to the conference based on the particular call-taker being connected to the conference.

7. The method of claim 1, further comprising:
displaying a map indicating the location of the caller on a screen of the particular call-taker; and
displaying video received from the caller on the screen of the particular call-taker.

8. The method of claim 1, further comprising:
recording a time of the emergency communication, data identifying the caller, data identifying the particular call-taker, and a time related to the emergency communication in a database.

9. The method of claim 1, further comprising:
sending the caller a message describing an emergency based on the nearness of the location of the caller and a location of a previously known emergency and based on the nearness of a time of the emergency communication and a time associated with the previously known emergency;
receiving a response from the caller; and
connecting the caller to the conference if the response indicates the caller would like to be connected to a call-taker.

10. A non-transitory computer-readable medium storing instructions that, when executed by a processor, cause the processor to perform a method for connecting emergency communications, comprising:
receiving an emergency communication at a particular public safety answering point from a caller directed to the particular public safety answering point by a location-to-service system;
automatically creating a conference on a conference system in response to the particular public safety answering point accepting the emergency communication prior to communications between a particular call-taker and the caller;
connecting the particular call-taker to the conference;
connecting the caller to the conference;
determining the location of the caller;
querying the location-to-service system to identify at least one particular emergency responder of a plurality of emergency responders; and
connecting at least one of the at least one particular emergency responder to the conference.

11. The non-transitory computer-readable medium of claim 10, the method further comprising inhibiting the caller from terminating the connection of the caller to the conference until the particular call taker indicates the conference can terminate.

12. The non-transitory computer-readable medium of claim 10, the method further comprising selecting the particular call-taker of a plurality of call-takers based on a language preference of the particular call-taker and a language preference of the caller.

13. The non-transitory computer-readable medium of claim 10, the method further comprising calling back the caller if the connection of the caller to the conference is terminated.

14. The non-transitory computer-readable medium of claim 10, wherein the conference is at least one of a voice conference, a text conference, and a video conference.

15. The non-transitory computer-readable medium of claim 10, wherein the caller is connected to the conference based on the particular call-taker being connected to the conference.

16. The non-transitory computer-readable medium of claim 10, the method further comprising:
  displaying a map indicating the location of the caller on a screen of the particular call-taker; and
  displaying video received from the caller on the screen of the particular call-taker.

17. The non-transitory computer-readable medium of claim 10, the method further comprising:
  recording a time of the emergency communication, data identifying the caller, data identifying the particular call-taker, and a time related to the emergency communication in a database.

18. The non-transitory computer-readable medium of claim 10, the method further comprising:
  sending the caller a message describing an emergency based on the nearness of the location of the caller and a location of a previously known emergency and based on the nearness of a time of the emergency communication and a time associated with the previously known emergency;
  receiving a response from the caller; and
  connecting the caller to the conference if the response indicates the caller would like to be connected to a call-taker.

19. A public safety answering point comprising:
  a plurality of call-takers;
  a policy server storing information indicating the availability of the plurality of call-takers;
  a controller in communication with the policy server for selecting a particular call-taker of the plurality of call-takers based at least in part on the information indicating availability of the plurality of call-takers stored in the policy server; and
  a conference system in communication with the plurality of call-takers, the controller, and a plurality of emergency responders;
  wherein the controller:
    receives an emergency communication from a caller directed to the public safety answering point by a location-to-service system;
    automatically creates a conference on the conference system in response to accepting the emergency communication at the public safety answering point prior to communications between a particular call-taker and the caller;
    connects the particular call-taker to the conference;
    connects the caller to the conference;
    determines the location of the caller;
    queries the location-to-service system to identify at least one particular emergency responder of a plurality of emergency responders;
    connects at least one of the at least one particular emergency responder to the conference.

20. The public safety answering point of claim 19, wherein the controller further inhibits the caller from terminating the connection of the caller to the conference until the particular call-taker indicates the conference can terminate.

21. The public safety answering point of claim 19, wherein the controller further calls back the caller if the connection of the caller to the conference is terminated.

22. The public safety answering point of claim 19, wherein the controller further connects the caller to the conference based on the particular call-taker being connected to the conference.

23. The public safety answering point of claim 19, further comprising a call-record database in communication with the controller and wherein the controller further records a time of the emergency communication, data identifying the caller, data identifying the particular call-taker, and a time related to the emergency communication in the call-record database.

24. The public safety answering point of claim 19, wherein the controller further:
  sends the caller a message describing an emergency based on the nearness of the location of the caller and a location of a previously known emergency and based on the nearness of a time of the emergency communication and a time associated with the previously known emergency;
  receives a response from the caller; and
  connects the caller to the conference if the response indicates the caller would like to be connected to a call-taker.

* * * * *